(12) United States Patent
Kumar (10) Patent No.: US 11,743,211 B2
(45) Date of Patent: Aug. 29, 2023

(54) BOT OMNI CHANNEL AUTO EXPANSION

(71) Applicant: ORACLE INTERNATIONAL CORPORATION, Redwood Shores, CA (US)

(72) Inventor: Vivek Kumar, Austin, TX (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/563,690

(22) Filed: Dec. 28, 2021

(65) Prior Publication Data

US 2023/0208784 A1    Jun. 29, 2023

(51) Int. Cl.
| | | |
|---|---|---|
| *H04L 12/00* | (2006.01) | |
| *H04L 51/02* | (2022.01) | |
| *G06F 8/36* | (2018.01) | |
| *G06F 9/451* | (2018.01) | |

(52) U.S. Cl.
CPC ............... *H04L 51/02* (2013.01); *G06F 8/36* (2013.01); *G06F 9/451* (2018.02)

(58) Field of Classification Search
CPC . H04L 51/02; G06F 40/30; G06F 8/36; G06F 9/451; G06N 5/046; G06N 3/08
USPC .......................................... 709/206; 707/722
See application file for complete search history.

(56) References Cited

U.S. PATENT DOCUMENTS

| | | |
|---|---|---|
| 10,841,251 B1 | 11/2020 | Ramachandran et al. |
| 10,951,552 B2 | 3/2021 | Jafar Ali et al. |
| 11,190,466 B2 | 11/2021 | Whitten et al. |
| 11,195,532 B2 | 12/2021 | Teserra et al. |
| 2018/0025085 A1* | 1/2018 | Sarangi ............... H04L 67/02 707/722 |
| 2018/0096285 A1* | 4/2018 | Fedak .................. G06F 40/30 |
| 2018/0322403 A1* | 11/2018 | Ron ...................... H04L 67/63 |
| 2020/0163109 A1* | 5/2020 | Zhang ................. H04W 72/23 |
| 2021/0083993 A1 | 3/2021 | Highman et al. |

(Continued)

FOREIGN PATENT DOCUMENTS

WO    2020163109 A1    8/2020

OTHER PUBLICATIONS

KORI.ai; The Kore.ai Omnichannel Approach, pp. 1-3; downloaded from: https://kore.ai/platform/features/omnichannel/ on Dec. 27, 2021.

(Continued)

*Primary Examiner* — Frantz Coby
(74) *Attorney, Agent, or Firm* — Kraguljac Law Group, LLC (57) ABSTRACT

Systems, methods, and other embodiments associated with automatically expanding channels for bots are described. In one embodiment, a system includes a bot repository configured to identify each bot of a plurality of bots available in the computing system. A channel metadata repository is configured with channel configuration metadata for each channel of a plurality of channels available to the plurality of bots. The channel configuration metadata includes metadata that defines a specified format for communicating data with a target channel. A bot manager is configured to provide communication between each bot of the plurality of bots and each channel of the plurality of channels by at least converting output responses from each bot based on the channel configuration metadata associated with a target channel.

20 Claims, 7 Drawing Sheets

(56) References Cited

U.S. PATENT DOCUMENTS

| | | |
|---|---|---|
| 2021/0141820 A1 | 5/2021 | Vora et al. |
| 2021/0144107 A1 | 5/2021 | Liang et al. |
| 2021/0306463 A1 | 9/2021 | Doumar et al. |
| 2022/0164643 A1* | 5/2022 | Charnock .............. G06N 5/046 |

OTHER PUBLICATIONS

KORI.ai; Channel Enablement, pp. 1-6, downloaded from: https://developer.kore.ai/docs/bots/channel-enablement/adding-channels-to-your-bot/ on Sep. 13, 21.

SALESFORCE; Deploy Your Bot to Your Channels, pp. 1-3; downloaded from: https://help.salesforce.com/s/articleView?id=sf.bots_service_deploy_to_channels.htm&type=5 on Sep. 13, 2021.

SALESFORCE; Service Cloud Channels, pp. 1-2; downloaded from: https://help.salesforce.com/s/articleView?id=sf.support_channels.htm&type=5 on Sep. 13, 2021.

MICROSOFT AZURE; Configure a Bot to Run on One or More Channels; Sep. 13, 2021; pp. 1-6; downloaded from: https://docs.microsoft.com/en-us/azure/bot-service/bot-service-manage-channels?view=azure-bot-service-4.0 on Sep. 13, 2021.

AVAAMO; Deliver an Omni Channel Experience for Employees and Customers—Avaamo; pp. 1-2; downloaded from https://avaamo.ai/ai/ai-smart-assistant/ on Sep. 13, 2021.

BOTCORE.AI; Omnichannel Chatbots; Build Omnichannel Bots / Deploy a Chatbot on Multiple Channels; pp. 1-15 downloaded from: https://botcore.ai/omnichannel-chatbot/ on Sep. 13, 21.

BOTCORE.AI (Shanbhag); Transforming Omnichannel Customer Service With Chatbots; Oct. 19, 2020pp 1-8; downloaded from: https://botcore.ai/blog/omnichannel-customer-service-chatbots/.

* cited by examiner

Bot Repository 120

| Bot Id | Bot Name | Description | Owner | Created On | Type |
|---|---|---|---|---|---|
| 19e9e | SalesBot | For sales operations | Vik Kumar | 4/10/19 | External |
| U373d | ServiceBot | For customer support | John Doe | 5/1/20 | External |
| Kdk922 | HrBot | For employee support | Jane Doe | 8/5/20 | Internal |

BOT OMNI CHANNEL AUTO EXPANSION

BACKGROUND

A "bot" refers to a computer program or software-based robot implemented to perform a specified task. For example, a bot may be deployed to perform a simple task or a specific task. More complex bots such as chatbots can simulate human responses or conversations to answer questions from users.

A bot can be programmed and capable of having a discussion/conversation with a human. A user might, for example, ask the bot a question ("Where is my order") or make a statement, and the bot would answer or perform an action as necessary.

Front-end systems may provide an interface where users interact with a bot. These are client-facing systems such as Facebook Messenger, WhatsApp Business, Slack, Google Hangouts, a company website or mobile app, etc. Each of these are referred to as a channel. A group of communication channels that are available in a system are referred to collectively as omni channel or omni channel structure.

An enterprise or company may have many "bots" to support various operations such as customer service, sales, finance, marketing etc. These bots are made to be available on multiple channels for a greater customer or end user experience. Implementing bots on multiple channels is very resource intensive. Each bot must be programmed specifically to handle communications with each particular channel using the communications protocol of that channel.

In order for any bot to interact with a new channel, the bot must be reprogrammed for the new channel and redeployed on the system. The reprogramming must be repeated for every bot. Thus, the resource investment and complexity multiply when an Enterprise needs to support multiple bots to support different functions, and the multiple bots are made to operate with multiple channels. Large enterprises that are spread across different departments and different geographies experience more complex bot and channel configuration issues. Enterprises may not even be aware of all the bots that exist in the system or the channels that exist. As such, the channels are not available for use until the bots are reprogrammed and reconfigured to specifically operate with each channel.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Systems and methods are described herein that auto-discover and automatically expand the availability of multiple bots (e.g., chat bots, digital assistants, etc.) on multiple communication channels. A group of communication channels that are available in a system are referred to collectively as omni channel or omni channel structure. In one embodiment, the omni channel is configured by an enterprise to provide customer support on multiple channels such as Facebook messenger, WhatsApp, websites, mobile apps, text messaging, Slack, Twitter, or other messaging platform.

In one embodiment, the present auto expansion system is configured to auto-discover omni channels available on a platform and then allow all existing bots and future bots (bots added to the platform in the future) to automatically leverage omni channel support with minimal efforts. In other words, the present system allows all bots to automatically discover all available channels and any newly added channel. The present system allows all bots to function with all available channels regardless of whether the bot is programmed to communicate with a specific channel. Furthermore, the present system eliminates or at least reduces the need to hardcode each bot to function with each available channel, which is a very large programming, testing, and deployment process.

For example, in previous systems, if a bot is intended to support three (3) different channels, the bot would need to be programmed to communicate specifically with three different communication protocols. Each channel communicates in their own channel dependent protocol and the bot would need to recognize each protocol and generate output that complies with the channel dependent protocol. This means that the bot must be programmed to receive input and generate output with the correct format, syntax, fields, parameters, etc. as required by the protocol of each different channel. If a new channel is added to the system, the bot cannot function with the new channel. The bot must first be manually reprogrammed to communicate with the new channel.

As such, enterprises deploying multiple bots on a large number of omni channels has to repeat the entire process of manually programming and deploying every bot to make existing bots and new bots function with a newly added channel. The present system eliminates this problem.

With the present system, a bot may be generically programmed to accept non-channel specific input (e.g., channel independent input) and to generate non-channel specific output (e.g., channel independent output). Thus, a bot does not need to be specially programmed for any channel, which greatly reduces the complexity of programming and configuring of the bot. Programming efforts can then be focused on the function(s) performed by the bot and not on the channel communication protocols for each supported channel. Even if a bot is specially programmed to function with one or more channels, the bot will be able to function with all other channels on the system that the bot is not programmed for.

New bots may be added and deployed on the platform at any time and new channels may be added at any time without reprogramming the bots. Once a new bot is deployed, the new bot will automatically have access to all available channels via the present system. When a new channel is added (which expands the available number of channels), all existing bots will automatically have access to and be able to communicate with the newly added channel without reprogramming the bots due to the interface and translation mechanism of the present system.

In one embodiment, the present auto expansion system provides a communication interface between channels and bots that converts input and/or output responses between the channels and the bots so that the responses are recognized by each other. The present system implements a configuration and technique that provides for automatic discovery of all omni channels and provides for automatic expansion when new channels are added.

System Overview

Figure 1:
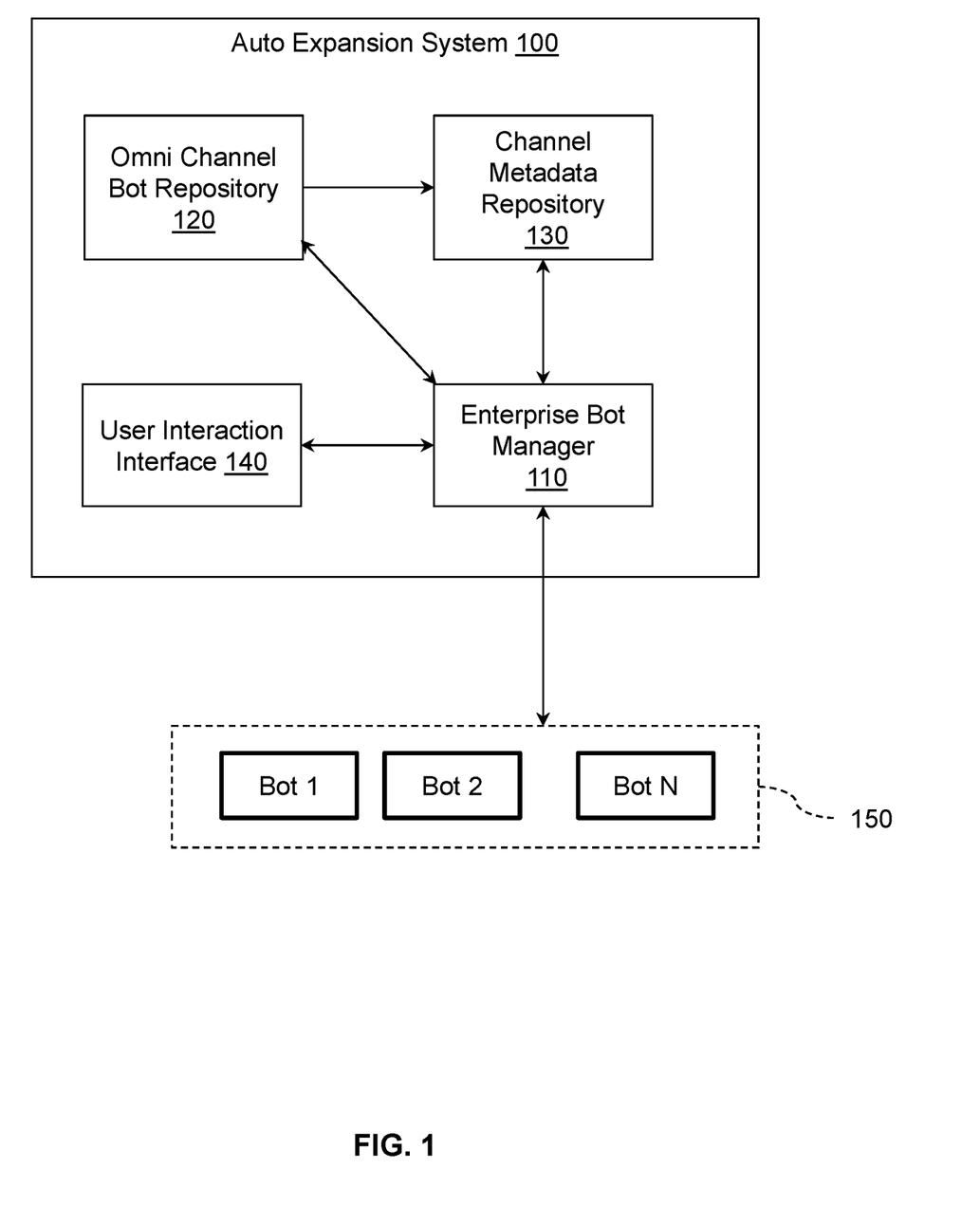
FIG. 1 illustrates one embodiment of a bot and channel auto expansion system.

With reference to FIG. 1, one embodiment of a bot omni channel auto expansion system 100 (herein "auto expansion system") is illustrated. The auto expansion system 100 is configured to provide a mechanism to register bots in the system and all channels supported by the system/platform (e.g., an enterprise or other system). The auto expansion system 100 is configured with a communication interface for translating and/or converting communications between each supported channel and a group of bots 150 available to the system so that the bots do not need to be programmed for any particular communication channel.

To implement the above functions, the auto expansion system 100 includes an enterprise bot manager 110 that controls the functions of the system and the communication interface between the channels and the bots 150. A bot repository 120 is a data structure that contains information about each registered bot 150. A channel metadata repository 130 is a data structure that contains information about each supported channel in the system. The channel metadata repository 130 includes channel metadata for each supported channel that defines a specific data protocol/format used by an associated channel. Once the channel metadata for a channel is added/registered in the channel metadata repository 130, the channel is automatically available for use by all of the bots (regardless of how the bot is programmed).

A user interaction interface 140 may also be included but may be a separate module from the auto expansion system 100. The user interaction interface 140 is configured to provide access between a channel and the present system 100 via network communications. In one embodiment, the user interaction interface 140 is implemented separately for each channel and is part of the application where a user interacts with a channel (e.g., user is on Slack) to access the bots of the present system 100.

The system components are further described below.

Functionality Overview

Figure 2:
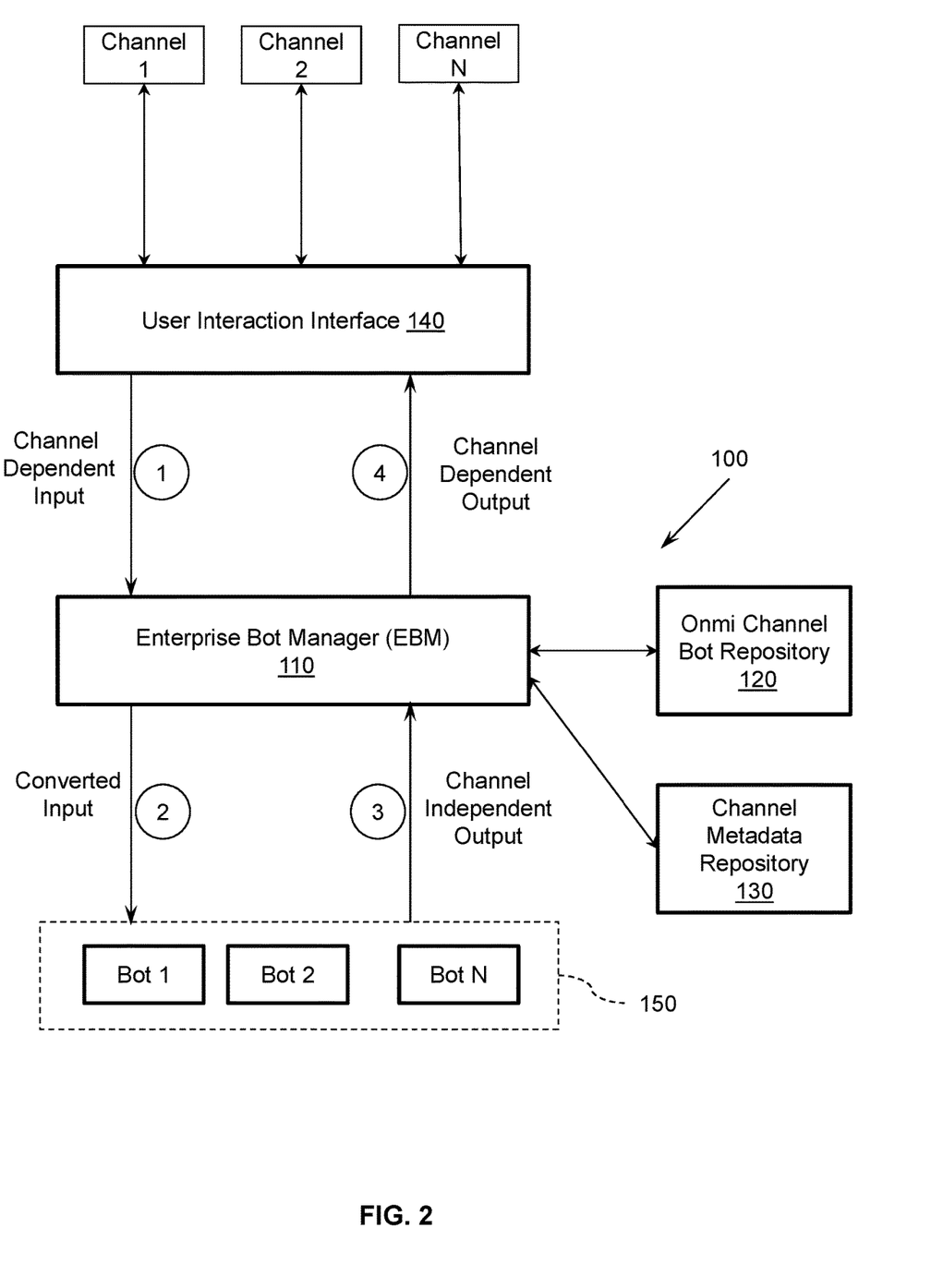
FIG. 2 illustrates another embodiment of an operation of the auto expansion system.

With reference to FIG. 2, in one embodiment, the functionality of the auto expansion system 100 is shown. FIG. 2 shows a number of channels: channel 1, channel 2, . . . channel N which can communicate to the system 100 by network communications via the user interaction interface 140. Example channels may include but are not limited to, WhatsApp, websites, mobile apps, text messaging, Slack, Twitter, Facebook messenger, or other messaging platform.

The user interaction interface 140 may be an application and a network interface associated with a channel that provides a connection to the present system 100. Each channel may have its own user interaction interface 140 that is accessible by a user on that particular channel and allows a user to send messages and requests to the present system 100. The user interaction interface 140 is beyond the scope of this disclosure and is not discussed in detail.

When a user is interacting with one of the channels (e.g., Slack), the user may input a text question to a company such as "where is my order?" The channel generates a communication output (e.g., a request) that has a channel specific protocol/format, which includes the text question. In FIG. 2, the progression or stages of the request as it passes through the present system 100 is shown by the numbers in circles "1", "2", "3", and "4."

At stage "1," the enterprise bot manager 110 (EBM) receives the request from a channel (also referred to as the source channel). The request is input data and is configured in the channel's protocol format. This format is channel dependent and thus is labeled "channel dependent input" at stage "1." The request includes at least the question (e.g., some kind of text from the user) and a parameter/metadata that identifies the source channel (e.g., a channel ID or name).

To be able to recognize the channel dependent input, the EBM 110 looks up channel metadata from the channel metadata repository 130 corresponding to the source channel. One embodiment of channel metadata is discussed with reference to FIG. 4. Using the channel metadata, the channel dependent input is recognizable, and components of the input can be identified. The components may include different types of data in the request, different data parameters, formatting, other metadata associated with the source channel, etc. The EBM 110 is configured to identify the actual user text from the request using the channel metadata because the actual user text is the information that a bot will respond to.

Each different channel may configure the user text differently and/or place the user text in a different location within the channel dependent input data. Thus, the channel metadata associated with the particular channel identifies how to find the user text (or other parameter that may be of interest). This allows the user text to be extracted from the channel dependent input thus separating the user text from any other additional data parameters, formatting or metadata included in the channel dependent input that was created by the source channel platform (e.g., Slack, Facebook, etc.).

The extracted user text becomes the modified/converted input at stage "2." The converted input may also be regarded as a customized version of the channel dependent input since the components that are channel specific are stripped away and not passed to a bot. The converted input (the user text) is configured in a format that the bot is programmed to expect as input (e.g., a text string).

Prior to sending the user text (e.g., the converted input) to a bot, the EBM 110 determines which bot from the available bots 150 is appropriate to process the user text. In one embodiment, a natural language processing (NLP) engine is part of or operates with the EBM 110. The natural language processing (NLP) engine is used to decipher the user text to determine its subject matter, meaning, and/or intent. In general, the NLP engine is configured to "understand" what the user text is.

Based on the determined intent of the user text, the EBM 110 identifies and selects an appropriate bot from the available bots 150 to handle the user text. The user text (the converted input) is then sent to the selected bot for processing.

Recall that each bot is implemented to perform a specific type of function, perform a specific task, perform a specific skill, handle a specific business function, or other specific action. For example, a Photo-bot may be implemented to find and retrieve an image based on a request. A Chat-bot may be implemented to hold a conversation with a human. An Expensive-Filing-bot may be implemented to perform actions for filing an expense report such as create an expense report, approve an expense report, file the expense report, check status of expense report, etc. Thus, the EBM 110 is configured to select and send the user text to an appropriate bot for processing, where the bot generates a corresponding result.

At stage "3," the selected bot generates an output result. Since the bot is not programmed for any specific channel, the output result is a channel independent output that is not formatted in a channel specific format. The output result could be text, an image, a complex output with a set of user actions, or other type of output based on the function performed by the bot.

The bot output result (the channel independent output) is returned to the EBM 110. The bot output may also include a channel ID (a number or name) that identifies which channel originated the user input (the source channel). This is the target channel that will receive the final response. In one embodiment, the channel ID is passed along with the user input to the selected bot and is part of the output of the selected bot.

In response to receiving the bot output, the EBM 110 accesses the channel metadata repository 130 using the channel ID. If the target channel is available in the metadata repository 130, the EBM 110 retrieves the corresponding channel metadata. The channel metadata is used by EBM 110 to transform the bot output into a channel specific protocol/format of the target channel. The transformed bot output is shown at stage "4" as "Channel Dependent Output." The channel dependent output (final response) is passed back to the user interaction interface 140 associated with the target channel where the end user is communicating with the system 100. Thus, the end user receives the final response to the user's original request.

With the present auto expansion system 100, all existing bots and bots added in the future can automatically leverage omni channel support. All the bots are able to operate with any channel that is configured in the channel metadata repository 130 without having to specifically program a bot to communicate with each channel. This means that a bot can be programmed and configured to be non-channel specific. Thus, a bot can simply generate an unformatted output. The present system 100 simplifies the implementation of supporting multiple channels and multiple bots making it simple to add new channels and add new bots with minimum configuration changes.

In one embodiment, the components of the auto expansion system 100 are described as follows.

Bot Repository

Figure 3:
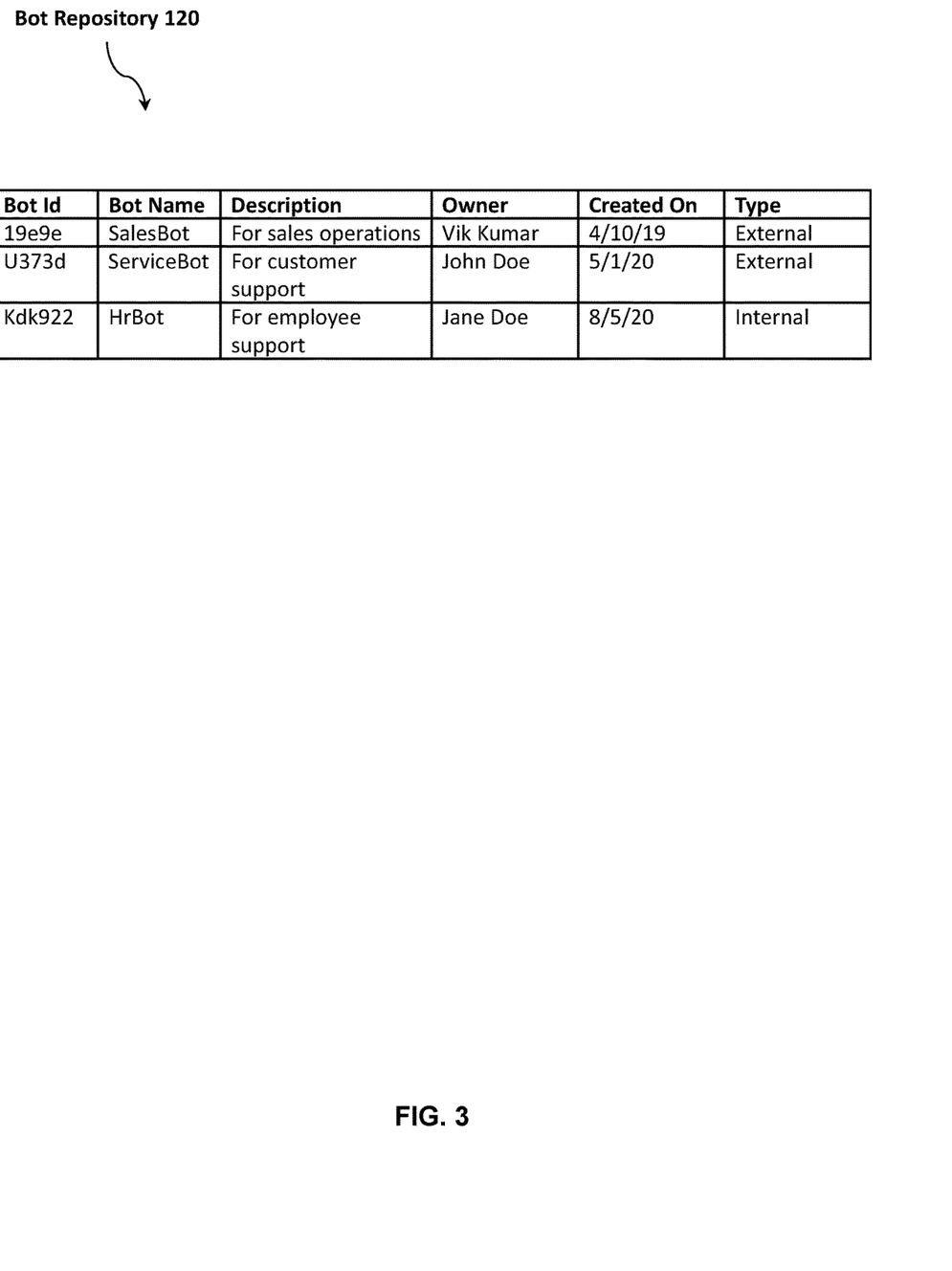
FIG. 3 illustrates one embodiment of a bot repository.

With reference to FIG. 3, one embodiment of the bot repository 120 is shown, which is configured in a table structure. The bot repository 120 is configured as a collection of all bots deployed in the system and/or supported by the system/enterprise. The bot repository 120 functions as a registration table and may include information about each bot registered and deployed in the system. For example, for each registered bot, the bot repository 120 may include a unique bot identifier, a bot name, description of the bot and/or the bot's primary function. Other metadata may also be included for each bot such as bot owner details, date of creation or operational date, type of bot, etc.

Each row in the table identifies one bot and provides one or more columns identifying properties associated with the bot. For example, as seen in FIG. 3, the columns may include bot ID, bot name, bot description, bot owner, date created on, and type of bot. These are provided as example columns and are not intended to be limiting.

In one embodiment, the "type" column indicates if the bot is exposed to the internet to make it available to the public (e.g., "External"). The "type" may indicate that the bot is restricted for "internal" use such as a payroll bot or human resources bot (HrBot) for employees only.

In another embodiment, the bot repository 120 may include an expansion setting column to control whether the associated bot is permitted to expand to the available channels or not (e.g., expansion=yes or no). A bot owner may wish to restrict a bot to only operate with channels that the bot is specifically programmed for. For example, the bot may be programmed to communicate with only Twitter and Slack. But since the bot is registered in the system, all channels are available to the bot via the present system. With the expansion setting, the bot owner may prohibit expansion (e.g., expansion=no) and thus the present system will not provide channel communication to all available channels for restricted bot.

When a new bot is added to the system 100, the new bot is registered in the bot repository 120 via a user interface. The user interface allows a user to input information about a new bot and the bot is assigned a unique bot ID so that the bot can be identified from other bots in the system. A bot may also be identified by its bot name. The actual bot (the executable code) is not part of the bot repository 120.

In one embodiment, the enterprise bot manager 110 is configured to automatically discover all available/registered bots in the system by accessing the bot repository 120.

Channel Metadata Repository

Figure 4:
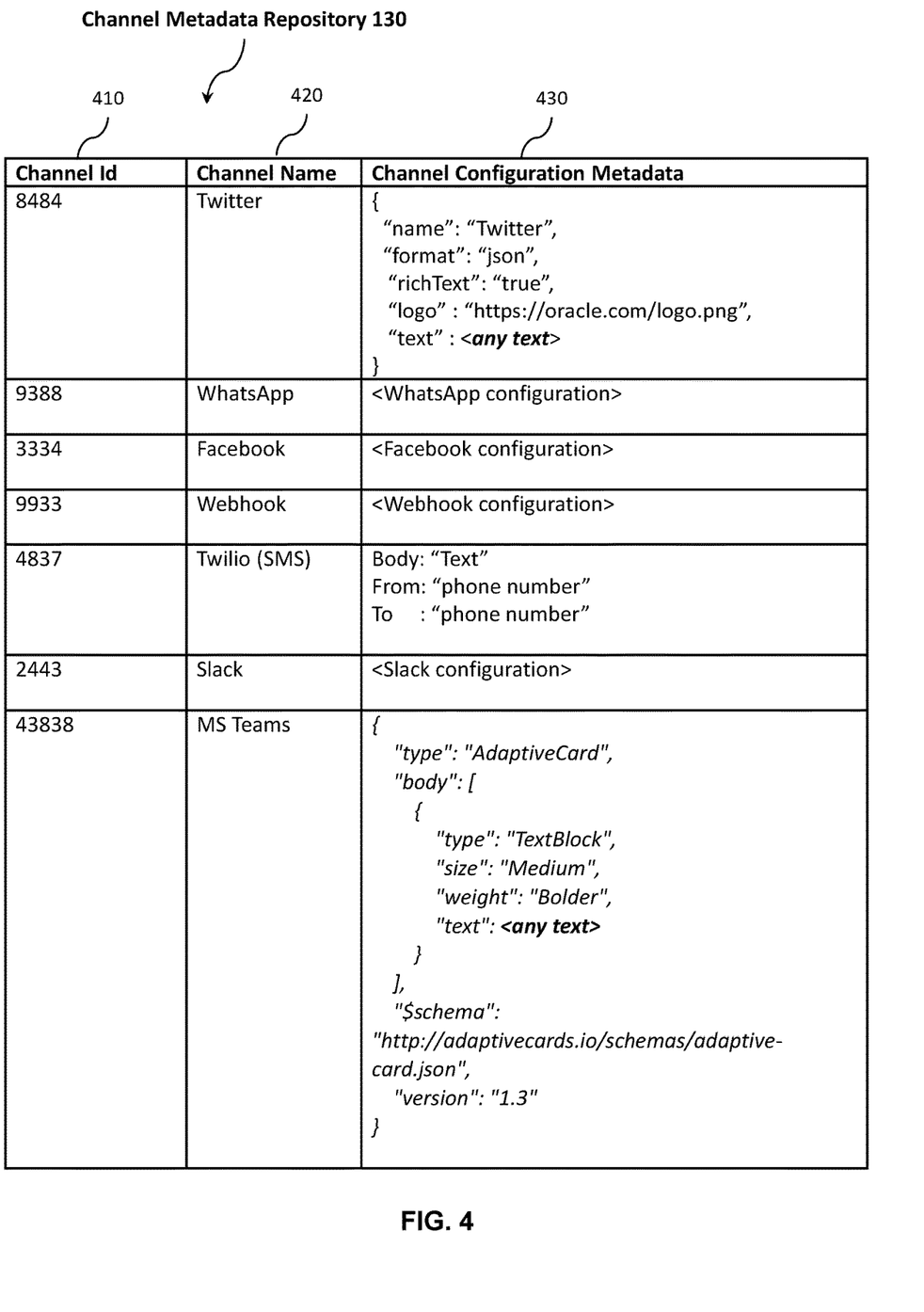
FIG. 4 illustrates an embodiment of a channel metadata repository.

With reference to FIG. 4, one embodiment of the channel metadata repository 130 is shown as a data table structure. The channel metadata repository 130 includes omni channel specific details for each channel supported by the enterprise/system. A user interface may be provided to allow new channels to be added to (or removed from) the channel metadata repository 130. Each channel is assigned, for example, a unique channel ID 410, a channel name 420, and its channel configuration metadata 430 (also referred to as "channel metadata") in a data record.

The channels supported by the enterprise/system are the channels that are available to the bots. When a decision is made to support a new channel, channel metadata for the new channel is added to the channel metadata repository 130. As will be explained below, all channels defined in the channel metadata repository 130 (including a newly added channel) are automatically available for use by all the existing bots in the system and by future bots that are added at a subsequent time.

In one embodiment, the channel metadata 430 defines the configuration and/or format of data that is outputted by an associated channel (e.g., channel-to-bot communication). Similarly, for data to be received and recognized by the associated channel (e.g., bot-to-channel communication), the data should be in the same configuration/format as defined by the channel metadata 430. The channel metadata 430 is also referred to herein as the channel protocol of a corresponding channel. In one embodiment, the channel metadata 430 for a particular channel may be known and/or determined from specifications of the channel, which may then be inputted into the channel metadata repository 130. The example formats for the channel metadata 430 shown in FIG. 4 are not intended to be limiting, and may change and may be changed for different implementations.

The channel configuration metadata 430 for a target channel is specific to the target channel and is used by the enterprise bot manager (EBM) 110 to recognize communication data received from the target channel. Using the channel metadata, the EBM 110 can correctly parse the communication data and identify different data components of the communication data. For example, the EBM 110 can identify the user text/message from data and disregard any other parts of the data that are not of interest. The EBM 100 may then generate a customized input based on the user text that is recognized by a receiving bot. In one embodiment, the customized/converted input is the user text separated from any other data that were part of the channel protocol.

As an example, with reference to FIG. 3, the channel metadata 430 for the channel Twitter defines a data format as: name, format, richText, logo, and text. The "text" corresponds to the actual user text that is inputted by a user and is directed to a bot. The other parameters/fields are added by Twitter to create the final outputted message in Twitter protocol. Thus, the channel metadata 430 identifies where the "text" occurs in the data so that the text may be located and extracted. The "text" portion is what a bot typically is expecting as input so that the bot can respond to the text. Once the bot generates a bot output response to the user text, the EBM 110 converts the bot output response into the Twitter format of: name, format, richText, logo, and text based on the channel metadata associated with the Twitter channel. The converted bot output response in Twitter format is then sent back to Twitter.

Accordingly, the channel metadata 430 that corresponds to a particular channel is used by the enterprise bot manager 110 to recognize the specific protocol and/or data format associated with that particular channel. As explained above, the channel metadata 430 corresponding to a target channel is used to recognize output data from the target channel and determine what portion(s) is needed by a bot (e.g., the text portion). On the other end, the channel metadata 430 is used to convert output data from a bot into a format recognized by a target channel. Thus, a bot does not need to be programmed to specifically support the communication protocol of any channel.

Enterprise Bot Manager

As previously stated, the enterprise bot manager (EBM) 110 is configured to function as a translation mechanism and/or interface to allow the channels and the bots to communicate with each other based on the channel metadata 430. The EBM 110 is configured to perform data transformations and data customizations to allow bots to communicate with any channel supported in the channel metadata repository 130. The enterprise bot manager 110 handles the communications to and from each of the channels listed in the channel metadata repository 130 to ensure that the communications have the correct format as required by each target channel and each target bot. As such, the EBM 110 is configured as an interpreter that sits in front of the group of bots 150 to communicate with the channels.

Accordingly, a bot does not need to be specifically programmed to receive and recognize the signals/data from any channel. Also, each bot does not need to be programmed to generate the appropriate output signal/data that is required by a target channel to receive a bot output. The enterprise bot manager 110 is configured to provide communication between each bot of the plurality of bots and each channel of the plurality of channels by at least converting data/output responses from any one of the bots based on the channel configuration metadata 430 associated with a target channel.

In another embodiment, in response to a new bot being registered in the bot repository 120, the EBM 110 is configured to automatically provide communication between the new bot and all of the plurality of channels. The EBM 110 functions as a translator and interface for all bots. Since the new bot is added to the system, the new bot can automatically function with any of the supported channels in the channel metadata repository 130. The EBM 110 converts input and/or output responses between the new bot and a selected channel based at least in part on the channel configuration metadata 430 associated with the selected channel from the channel metadata repository 130.

As previously explained, a bot does not need to be programmed for a specific channel. Rather, one or more bots of the bots 150 available in the computing system may be configured to generate a non-formatted or otherwise channel independent output. The bot manager 110 is configured to provide communication to a target channel by converting the channel independent output from the one or more bots to a channel dependent output that is in the specified format for the target channel. The converting function uses the channel configuration metadata 430 associated with the target channel.

Figure 5:
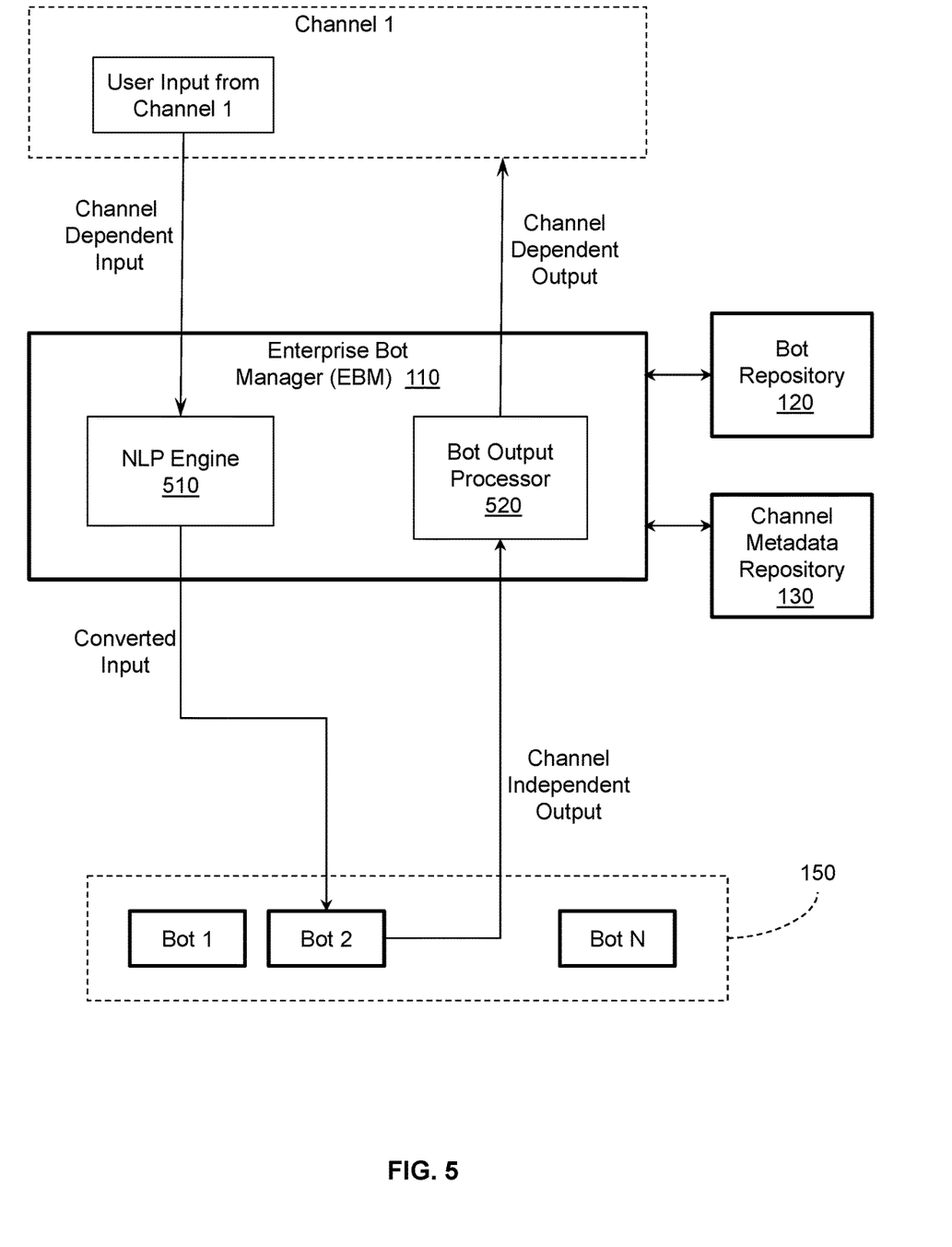
FIG. 5 illustrates another embodiment of a bot manager associated with auto expansion.

With reference to FIG. 5, another embodiment of the enterprise bot manager 110 (from FIGS. 1 and 2) is shown along with another example communication process between a channel and bot. The enterprise bot manager 110 may include one or more modules and may include a Natural Language Processing (NLP) engine 510 and a bot output processor 520. These modules are independent of a target channel from where a user is interacting with a bot.

The NLP engine 510 is configured to process user input coming from a target channel (e.g., channel-to-bot communications). The bot output processor 520 is configured to process output coming from the bots 150 (e.g., bot-to-channel communications) and configure the output into a channel-specific format (channel dependent output) for a target channel.

With reference to FIG. 5, another example communication between a channel and a bot is described along with the operation of the present system. In one embodiment, the operation is described as a method 600 shown in FIG. 6.

To initiate, a user (operating on channel 1) submits a request/message or other text (labeled "user input from Channel 1"). Suppose the actual text entered by the user is "what is my order status?" The user input is transmitted by the channel and is received by the EBM 110 as input in a channel specific format (channel dependent input). The user input in the channel specific format includes the actual text combined and formatted with other data and/or parameters.

In response to the channel dependent input being received, the EBM 110 determines which channel the input came from, for example, from a channel ID or other identifier that may be part of the communication from the channel 1. Channel 1 is identified as the source channel. The EBM 110 retrieves channel metadata corresponding to the channel 1 from the channel metadata repository 130. The EBM 110 uses the channel metadata to recognize the channel dependent input and identify the actual text of the user input. The actual text "what is my order status?" is extracted.

The NLP engine 510 is configured to resolve the intent of the user input and identify a specific bot that is configured to handle that type of user input. In this example, the NLP 510 determines that "what is my order status?" is an order-related question and identifies which bot handles orders from the plurality of bots 150. The NLP 510 determines that bot #2 is the Order-Bot and thus routes the question to bot #2, the Order-Bot. In one embodiment, the bot may be identified by analyzing the bot repository 120 and finding a bot description that corresponds to the subject matter of the actual text from the user input.

Once the appropriate bot is identified, the actual text extracted from the user input "what is my order status?" becomes the converted input that is sent to the Order-Bot. The bot performs its function and/or business actions and an output is generated. For example, the Order-Bot generates the output, "Your order is pending shipment." The bot output is channel independent and thus not in any particular format since the bot is not programmed to communicate with any channel.

The bot output processor 520 is configured to receive the outputs from the plurality of bots 150, which also include the channel ID of the source channel (channel 1) that originated the communication. The source channel becomes the target channel for receiving the bot response. When the bot output is received, the bot output 520 accesses the channel metadata repository 130 to review the channel metadata associated with channel 1.

If the channel metadata is available, the channel metadata is retrieved. The channel metadata is then used by the bot output processor 520 to transform the bot output to the target channel format (channel dependent output) of channel 1. The transformed output is then passed back to a user interaction module associated with channel 1, where the end user is communicating with the system. This process is repeated for other communications between any of the channels and the bots thereby making all the channels available to all the bots.

Figure 6:
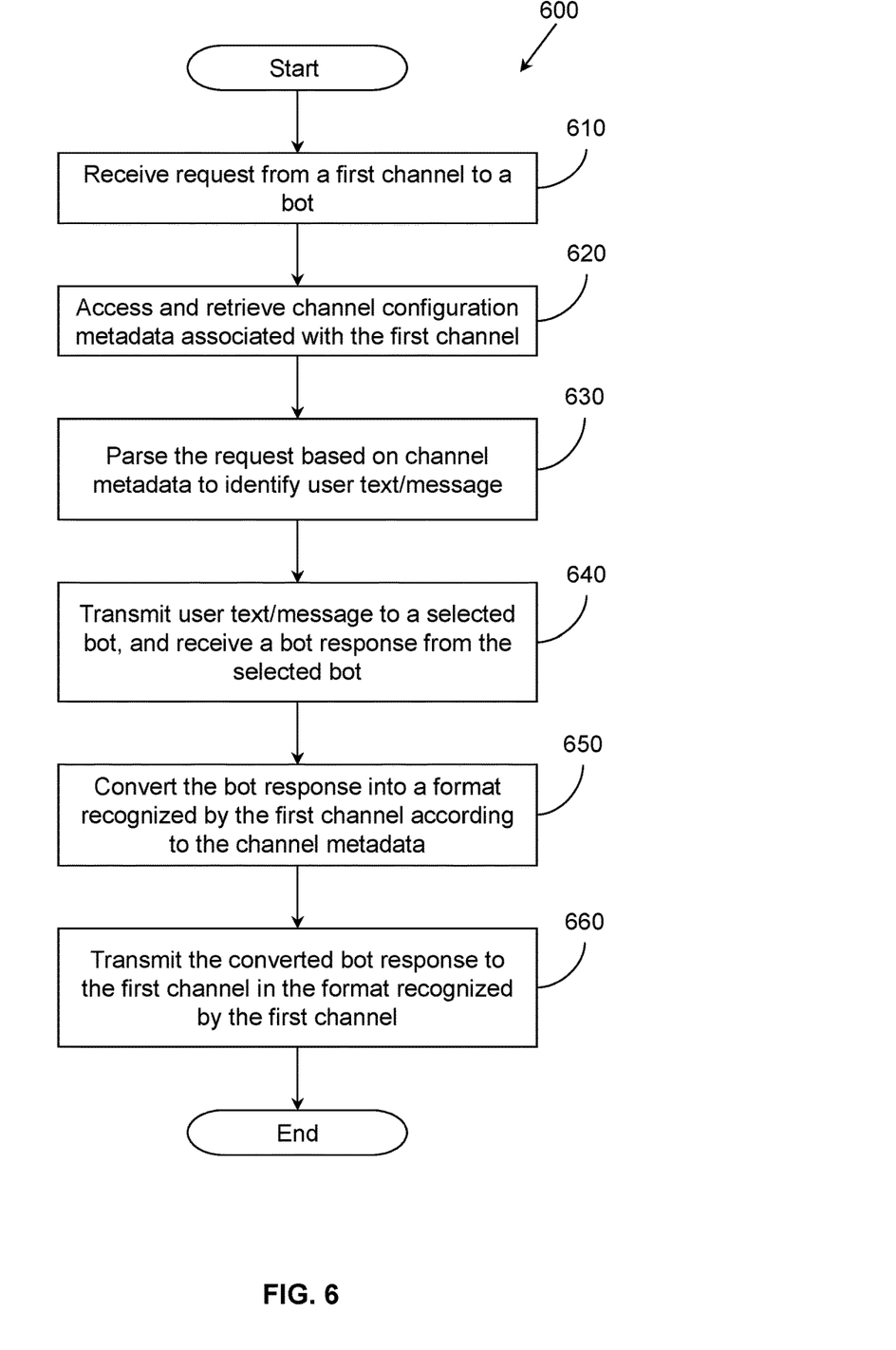
FIG. 6 illustrates one embodiment of a method associated with auto expansion and communicating between channels and bots.

With reference to FIG. 6, another embodiment of the operation of the enterprise bot manager (EBM) 110 is described as a method 600 and is a summary of the process described in FIG. 5.

At block 610, in response to receiving a request directed to a bot system, the EBM 110 determines that the request came from a first channel. The request is formatted based on a communications protocol of the first channel. At block 620, the EBM 110 determines how to recognize the request by accessing the channel metadata repository and retrieving channel configuration metadata associated with the first channel.

As previously explained, the channel metadata repository contains channel configuration metadata for a plurality of channels. The channel configuration metadata for a given channel includes metadata that defines a specified format for communicating data with the given channel based on a communications protocol of the given channel. Thus, the EBM 110 can recognize the format of the request by using the channel metadata of the first channel.

At block 630, the EBM 110 parses the request, based on the first channel configuration metadata, to identify and extract the user text/message that was actually inputted by the user.

At block 640, EBM 110 identifies and selects an appropriate bot that is configured to handle the type of user text/message and transmits the user text/message to the selected bot in the bot system. In return, the selected bot generates a bot response to the user text/message.

At block 650, EBM 110 converts the bot response according to the first channel configuration metadata to transform the bot response into the specified format recognized by the first channel based on the communications protocol of the first channel.

At block 660, EBM 110 transmits the converted bot response to the first channel in the format recognized by the first channel. The process repeats for other communications between channels and bots as previously described.

Channel Example

As previously described, the input data from each channel comes in a channel specific format. The following example is based on the channel configuration metadata 430 shown in FIG. 4 for Channel Name "Twitter."

For example, a user that is interacting with a bot interface on Twitter may input a question that reads "what is my order status?" Twitter sends the question (as input data) to the associated bot in a Twitter format/protocol that may have the format in Table 1:

TABLE 1

```
{
    "name": "twitter",
    "format": "json",
    "richText": "true",
    "logo" : "https://oracle.com/logo.png"
    "text" : "what is my order status"
}
```

The input data is received by the enterprise bot manager 110 and by the NLP engine 510. The source of the input data (the source channel from which the input data is received) is known from at least the communication channel being used and/or the source may be identified in the input data. Now, EBM 110 and the NLP engine without reading the channel metadata will not recognize the input data and thus will not know which part of the input data is the actual user text. Similarly, a bot that is not specifically programmed to communicate with Twitter will not recognize the input data.

To handle the input, the enterprise bot manager 110 accesses the channel metadata repository 130 and retrieves the channel metadata 430 corresponding to the source channel Twitter. Based on the channel metadata 430, the bot manager 110 determines the configuration of the Twitter input data and the order of parameters are: name, format, richText, logo, and text. Thus, the channel metadata 430 indicates to the bot manager 110 where the actual user "text" appears in the input data. As such, while reading and parsing the input data, the bot manager 110 may ignore everything and just identify what is in the "text" portion of the incoming input data. The text "what is my order status" is then extracted and transmitted to the associated bot to be processed.

Once the bot generates a bot response (e.g., "Your order has been shipped") that is being sent back to Twitter, the EBM 110 may again retrieve the channel metadata for the Twitter channel. The EBM 110 converts the bot response into the specified format according to the channel metadata which may look like the format in Table 2:

TABLE 2

```
{
  "name": "twitter",
  "format": "json",
  "richText": "true",
  "logo" : "https://oracle.com/logo.png",
  "text" : "Your order has been shipped"
}
```

Accordingly, the present system allows all bots to automatically discover all available channels and any newly added channel as soon as the channel is added. The present system allows all bots to function with all available channels regardless of whether the bot is programmed to communicate with a specific channel just by adding channel configuration metadata for each channel in the channel metadata repository.

Cloud or Enterprise Embodiments

In one embodiment, the auto expansion system 100 is a computing/data processing system including an application or collection of distributed applications for enterprise organizations. The applications and computing system 100 may be configured to operate with or be implemented as a cloud-based networking system, a software as a service (SaaS) architecture, or other type of networked computing solution. In one embodiment the auto expansion system 100 system is a centralized server-side application that provides at least the functions disclosed herein and that is accessed by many users via computing devices/terminals communicating with the computing system 100 (functioning as part of the server) over a computer network.

In one embodiment, one or more of the components described herein are configured as program modules stored in a non-transitory computer readable medium. The program modules are configured with stored instructions that when executed by at least a processor cause the computing device to perform the corresponding function(s) as described herein.

Computing Device Embodiment

Figure 7:
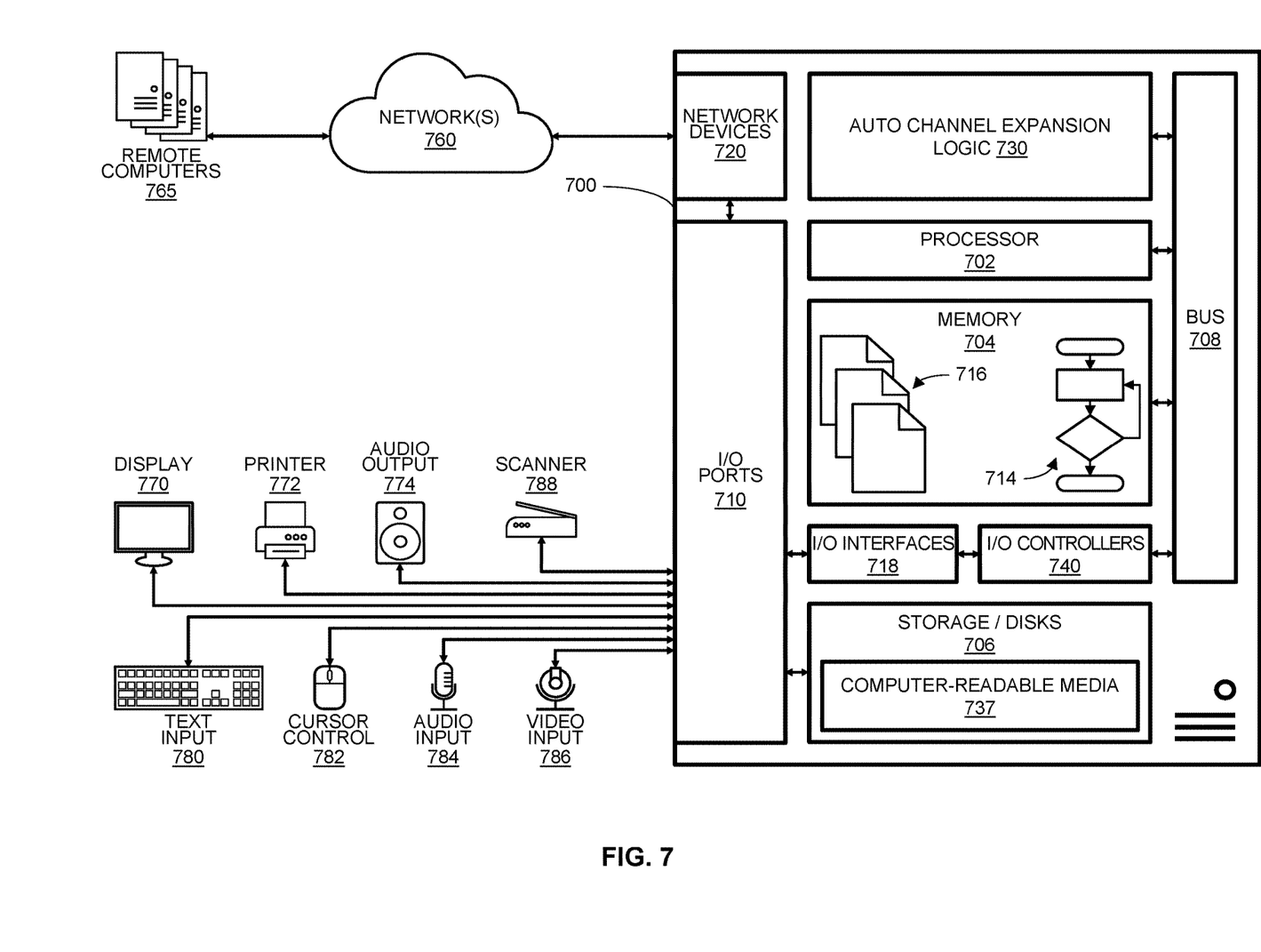
FIG. 7 illustrates an embodiment of a computing system configured with the example systems and/or methods disclosed.

FIG. 7 illustrates an example computing device that is configured and/or programmed as a special purpose computing device with one or more of the example systems and methods described herein, and/or equivalents. The example computing device may be a computer 700 that includes a processor 702, a memory 704, and input/output ports 710 operably connected by a bus 708. In one example, the computer 700 may include an automatic channel expansion logic 730 configured to facilitate automatic channel expansion similar to the auto expansion system 100 and/or the bot manager 110 shown in any one or more of the FIGS. 1-6.

In different examples, the auto expansion logic 730 may be implemented in hardware, a non-transitory computer-readable medium with stored instructions, firmware, and/or combinations thereof. While the logic 730 is illustrated as a hardware component attached to the bus 708, it is to be appreciated that in other embodiments, the logic 730 could be implemented in the processor 702, stored in memory 704, or stored in disk 706.

In one embodiment, logic 730 or the computer is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may also be implemented as stored computer executable instructions that are presented to computer 700 as data 716 that are temporarily stored in memory 704 and then executed by processor 702.

Logic 730 may also provide means (e.g., hardware, non-transitory computer-readable medium that stores executable instructions, firmware) for performing the auto expansion system 100.

Generally describing an example configuration of the computer 700, the processor 702 may be a variety of various processors including dual microprocessor and other multi-processor architectures. A memory 704 may include volatile memory and/or non-volatile memory. Non-volatile memory may include, for example, ROM, PROM, and so on. Volatile memory may include, for example, RAM, SRAM, DRAM, and so on.

A storage disk 706 may be operably connected to the computer 700 via, for example, an input/output (I/O) interface (e.g., card, device) 718 and an input/output port 710 that are controlled by at least an input/output (I/O) controller 740. The disk 706 may be, for example, a magnetic disk drive, a solid state disk drive, a floppy disk drive, a tape drive, a Zip drive, a flash memory card, a memory stick, and so on. Furthermore, the disk 706 may be a CD-ROM drive, a CD-R drive, a CD-RW drive, a DVD ROM, and so on. The memory 704 can store a process 714 and/or a data 716, for example. The disk 706 and/or the memory 704 can store an operating system that controls and allocates resources of the computer 700.

The computer 700 may interact with input/output (I/O) devices via the input/output (I/O) controller 740, the I/O interfaces 718 and the input/output ports 710. Input/output devices may be, for example, a keyboard, a microphone, a pointing and selection device, cameras, video cards, displays, the disk 706, the network devices 720, and so on. The input/output ports 710 may include, for example, serial ports, parallel ports, and USB ports.

The computer 700 can operate in a network environment and thus may be connected to the network devices 720 via the I/O interfaces 718, and/or the I/O ports 710. Through the network devices 720, the computer 700 may interact with a network. Through the network, the computer 700 may be logically connected to remote computers. Networks with which the computer 700 may interact include, but are not limited to, a LAN, a WAN, and other networks.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C §101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C §101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. §101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. §101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A computing system, comprising:
   at least one processor connected to at least one memory;
   a bot repository configured to identify each bot of a plurality of bots available in the computing system, wherein the bot repository includes at least a bot identifier for each bot;
   a channel metadata repository configured with channel configuration metadata for each channel of a plurality of channels available to the plurality of bots;
   wherein the channel configuration metadata includes metadata that defines a specified format for communicating data with a target channel from the plurality of channels; and
   a bot manager, executable by the at least one processor, configured to provide communication between each bot of the plurality of bots and each channel of the plurality of channels by at least converting output responses from each bot to the specified format based on the channel configuration metadata associated with a target channel.

2. The computing system of claim 1,
   wherein in response to a new bot being registered in the bot repository, the bot manager is configured to automatically provide communication between the new bot and any of the plurality of channels, by converting input and output responses between the new bot and a selected channel based at least in part on the channel configuration metadata associated with the selected channel from the channel metadata repository.

3. The computing system of claim 1, wherein one or more bots of the plurality of bots available in the computing system is configured to generate a channel independent output; and
   wherein the bot manager is configured to communicate to a target channel by converting the channel independent output from the one or more bots to a channel dependent output that is in the specified format for the target channel, wherein the converting uses the channel configuration metadata associated with the target channel.

4. The computing system of claim 1,
   wherein the channel metadata repository is configured to register a new channel in a data record, which adds the new channel to the plurality of channels;
   wherein the data record includes channel configuration metadata corresponding to the new channel that defines the specified format to communicate data with the new channel; and
   in response to the new channel being registered, the bot manager automatically provides communication between the new channel and the plurality of bots by translating input and output data based on the channel configuration metadata corresponding to the new channel.

5. The computing system of claim 1, wherein the bot manager is further configured to:
   receive a request from a first channel of the plurality of channels, wherein the request is formatted based on a communications protocol of the first channel;
   access the channel metadata repository and retrieve first channel configuration metadata associated with the first channel;
   parse the request, based on the first channel configuration metadata, to identify a message, and determine an intent of the message;
   identify a target bot from the plurality of bots that is configured to process actions for the identified intent; and
   transmit the message to the target bot;
   wherein the target bot generates a response to the message in a channel independent format.

6. The computing system of claim 1, wherein the bot manager is further configured to:
   receive requests from the plurality of channels, where each request has a channel dependent format that is specific to a source channel that sent the request;
   for a selected target bot from the plurality of bots, convert the channel dependent format to an input that is recognized by the selected target bot; and
   in response to receiving an output from any of the plurality of bots, converting the output to the channel dependent format associated with the source channel that sent the request and transmit the converted output to the source channel.

7. The computing system of claim 1, wherein the bot repository is configured to register the new bot that is added to the computing system;
   wherein the bot manager is configured to automatically discover all available bots based on the bot repository.

8. A computer-implemented method performed by a computing system, the method comprising:
   receiving a request directed to a bot system, wherein the request is received from a first channel and is formatted based on a communications protocol of the first channel;
   accessing a channel metadata repository and retrieving first channel configuration metadata associated with the first channel;
   wherein the channel metadata repository contains channel configuration metadata for a plurality of channels;
   wherein the channel configuration metadata for a given channel includes metadata for transforming input and output based on a communications protocol of the given channel to communicate with the given channel;
   parsing the request, based on the first channel configuration metadata, to identify and extract a message;
   transmitting the message to a selected bot in the bot system, wherein the selected bot generates a bot response to the message;
   converting the bot response according to the first channel configuration metadata to transform the response into a format recognized by the first channel based on the communications protocol of the first channel; and
   transmitting the converted bot response to the first channel in the format recognized by the first channel.

9. The method of claim 8, further comprising:
   registering a new bot to the bot system in a bot repository; and
   automatically discovering all available bots in the bot system based on the bot repository.

10. The method of claim 8, further comprising:
    registering a new bot to the bot system in a bot repository;
    wherein the new bot is configured to receive input that is channel independent and configured to generate an output that is channel independent;
    automatically expand communications to and from the new bot to any selected channel from the plurality of channels by converting input to and output from the new bot using the channel configuration metadata for the selected channel.

11. The method of claim 8, wherein the selected bot generates the bot response in a channel independent form that is not specific to a channel.

12. The method of claim 8, wherein after parsing the request to identify the message, the method further comprises:
   determining an intent of the message using a natural language processing engine;
   based on the intent, identifying the selected bot from a plurality of bots registered in the bot system that is configured to process actions corresponding to the intent identified; and
   transmitting the message to the selected bot.

13. The method of claim 8, further comprising:
   in response to a new channel being registered in the channel metadata repository, automatically providing communication between the new channel and the plurality of bots by translating input and output data based on the channel configuration metadata corresponding to the new channel;
   wherein the channel metadata repository is configured to register the new channel in a data record, which adds the new channel to the plurality of channels;
   wherein the data record includes the channel configuration metadata corresponding to the new channel that defines a specified format to communicate data with the new channel.

14. A non-transitory computer-readable medium that includes stored thereon computer-executable instructions that when executed by at least a processor of a computer cause the computer to:
   in response to receiving a request directed to a bot system, determine that the request came from a first channel;
   wherein the request is formatted based on a communications protocol of the first channel;
   access a channel metadata repository and retrieve first channel configuration metadata associated with the first channel;
   wherein the channel metadata repository contains channel configuration metadata for a plurality of channels;
   wherein the channel configuration metadata for a given channel includes metadata that defines a specified format for communicating data with the given channel based on a communications protocol of the given channel;
   parse the request, based on the first channel configuration metadata, to identify and extract a message;
   transmit the message to a selected bot in the bot system, wherein the selected bot generates a bot response to the message;
   convert the bot response according to the first channel configuration metadata to transform the bot response into the specified format recognized by the first channel based on the communications protocol of the first channel; and
   transmit the converted bot response to the first channel in the format recognized by the first channel.

15. The non-transitory computer-readable medium of claim 14, further comprising instructions that when executed by at least the processor cause the processor to:
   register a new bot to the bot system in a bot repository; and
   automatically discover all available bots in the bot system based on the bot repository.

16. The non-transitory computer-readable medium of claim 14, further comprising instructions that when executed by at least the processor cause the processor to:
   register a new bot to the bot system in a bot repository;
   wherein the new bot is configured to receive input that is channel independent and configured to generate an output that is channel independent; and
   automatically expand communications to and from the new bot to any selected channel from the plurality of channels by converting input to and output from the new bot using the channel configuration metadata for the selected channel.

17. The non-transitory computer-readable medium of claim 14, wherein the selected bot generates the bot response in a channel independent form that is not specific to the first channel.

18. The non-transitory computer-readable medium of claim 14, further comprising instructions that when executed by at least the processor cause the processor to:
   after parsing the request to identify the message:
   determine an intent of the message using a natural language processing engine;
   based on the intent, identify the selected bot from a plurality of bots registered in the bot system that is configured to process actions corresponding to the intent identified; and
   transmit the message to the selected bot.

19. The non-transitory computer-readable medium of claim 14, further comprising instructions that when executed by at least the processor cause the processor to:
   in response to a new channel being registered in the channel metadata repository, automatically provide communication between the new channel and the plurality of bots by translating input and output data based on the channel configuration metadata corresponding to the new channel;
   wherein the channel metadata repository is configured to register the new channel in a data record, which adds the new channel to the plurality of channels;
   wherein the data record includes the channel configuration metadata corresponding to the new channel that defines a specified format to communicate data with the new channel.

20. The non-transitory computer-readable medium of claim 14, further comprising instructions that when executed by at least the processor cause the processor to:
   after extracting the message from the request, identify an intent of the message;
   based on the intent of the message, determine and identify the selected bot from the plurality of bots that is configured to handle the intent of the message.

* * * * *

UNITED STATES PATENT AND TRADEMARK OFFICE
CERTIFICATE OF CORRECTION

| | |
|---|---|
| PATENT NO. | : 11,743,211 B2 |
| APPLICATION NO. | : 17/563690 |
| DATED | : August 29, 2023 |
| INVENTOR(S) | : Kumar |

It is certified that error appears in the above-identified patent and that said Letters Patent is hereby corrected as shown below:

In the Drawings

On sheet 2 of 7, in FIG. 2, under Reference Numeral 120, Line 1, delete "Onmi" and insert -- Omni --, therefor.

In the Specification

In Column 12, Line 62, delete "on)." and insert -- on. --, therefor.

Signed and Sealed this
Eighteenth Day of June, 2024

Katherine Kelly Vidal
*Director of the United States Patent and Trademark Office*